(12) United States Patent
Bare et al.

(10) Patent No.: US 9,996,551 B2
(45) Date of Patent: Jun. 12, 2018

(54) SYSTEM AND METHOD FOR DETERMINING AND MAINTAINING OBJECT LOCATION AND STATUS

(71) Applicant: Huntington Ingalls, Inc., Newport News, VA (US)

(72) Inventors: Brian Bare, Chesapeake, VA (US); Jonathan Martin, Virginia Beach, VA (US); Paul Sells, Newport News, VA (US); Patrick Ryan, Carrollton, VA (US)

(73) Assignee: Huntington Ingalls, Incorporated, Newport News, VA (US)

( * ) Notice: Subject to any disclaimer, the term of this patent is extended or adjusted under 35 U.S.C. 154(b) by 358 days.

(21) Appl. No.: 14/210,650

(22) Filed: Mar. 14, 2014

(65) Prior Publication Data

US 2014/0280199 A1    Sep. 18, 2014

Related U.S. Application Data

(60) Provisional application No. 61/787,780, filed on Mar. 15, 2013, provisional application No. 61/787,966, (Continued)

(51) Int. Cl.
*G06F 17/30* (2006.01)
*H04W 4/04* (2009.01)
(Continued)

(52) U.S. Cl.
CPC ........ *G06F 17/30241* (2013.01); *H04L 67/38* (2013.01); *H04W 4/043* (2013.01); *H04W 12/06* (2013.01); *H04L 63/0861* (2013.01)

(58) Field of Classification Search
None
See application file for complete search history.

(56) References Cited

U.S. PATENT DOCUMENTS 7,884,712 B2    2/2011  Nierenberg et al.
8,248,467 B1    8/2012  Ganick et al.
(Continued)

OTHER PUBLICATIONS

PCT International Search Report for International Application No. PCT/US2014/027283, dated Aug. 11, 2014, 2 pages.
(Continued)

*Primary Examiner* — Christopher J Raab
(74) *Attorney, Agent, or Firm* — Hunton Andrews Kurth LLP

(57) ABSTRACT

An asset information management system is provided for obtaining and storing information on assets disposed within a structural environment. The system comprises at least one mobile interface device for capturing information about a target object in the structural environment. An information management operating system operates on a central processor in communication with the mobile interface device and a local positioning system. The domain coordinate management system comprises one or more computers configured for establishing spatial addresses for spaces and points within the structural environment. The asset log comprises one or more data storage modules configured for storing information associated with objects disposed within the structural environment. The spatial indexing engine is configured for assigning a spatial address to the target object and for storing information associated with the target object in the asset log.

18 Claims, 2 Drawing Sheets

Related U.S. Application Data filed on Mar. 15, 2013, provisional application No. 61/788,104, filed on Mar. 15, 2013.

(51) Int. Cl.
*H04W 12/06* (2009.01)
*H04L 29/06* (2006.01)

(56) References Cited

U.S. PATENT DOCUMENTS

| | | |
|---|---|---|
| 8,547,222 B2 | 10/2013 | Aninye et al. |
| 2007/0081496 A1 | 4/2007 | Karget et al. |
| 2007/0081695 A1 | 4/2007 | Foxlin |
| 2007/0136041 A1 | 6/2007 | Sheridan |
| 2009/0319188 A1* | 12/2009 | Otto ................ G01C 21/32 701/300 |
| 2010/0191459 A1* | 7/2010 | Carter ................ G01C 21/32 701/532 |
| 2010/0287485 A1* | 11/2010 | Bertolami ............ G06F 3/011 715/764 |
| 2010/0321389 A1 | 12/2010 | Gay |
| 2011/0007076 A1* | 1/2011 | Nielsen ............ G06F 17/30241 345/441 |
| 2011/0066262 A1 | 3/2011 | Kelly |
| 2011/0115816 A1 | 5/2011 | Brackney |
| 2011/0121068 A1* | 5/2011 | Emanuel ................ G01S 5/16 235/375 |
| 2012/0202515 A1 | 8/2012 | Hsu et al. |
| 2012/0214515 A1 | 8/2012 | Davis et al. |
| 2013/0007747 A1 | 1/2013 | Chi et al. |
| 2013/0113993 A1 | 5/2013 | Dagit, III |
| 2013/0222270 A1* | 8/2013 | Winkler ............. H04M 1/0233 345/173 |
| 2013/0257850 A1* | 10/2013 | Chen ................ G06T 19/20 345/419 |
| 2013/0300830 A1* | 11/2013 | Solem ............ G06F 17/30241 348/46 |
| 2014/0375816 A1 | 12/2014 | Maihoefer |
| 2015/0193982 A1 | 7/2015 | Mihelich |

OTHER PUBLICATIONS

Extended European Search Report, European Patent Application No. 14770908.3, dated Aug. 18, 2016, pp. 1-2.

\* cited by examiner

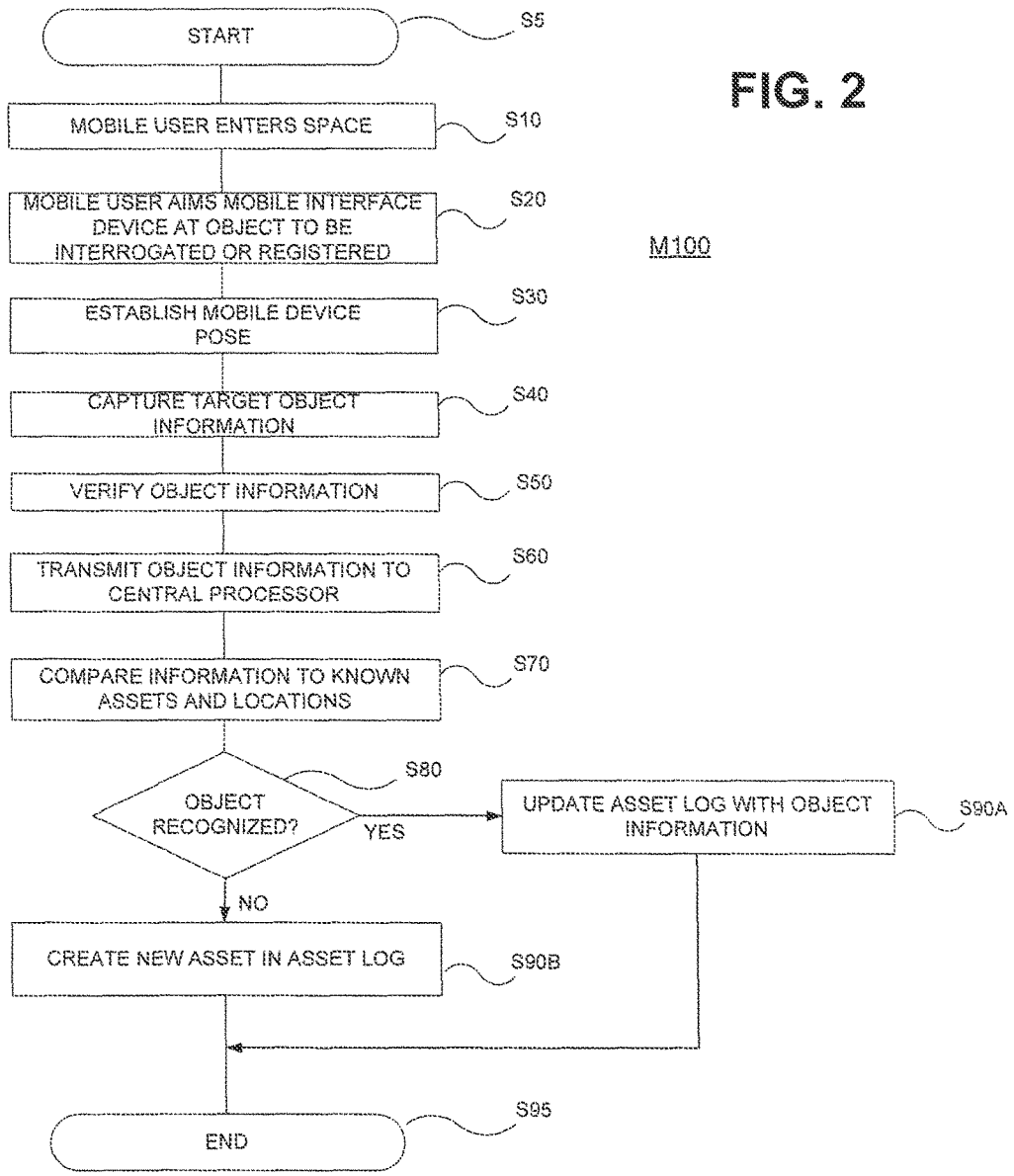

SYSTEM AND METHOD FOR DETERMINING AND MAINTAINING OBJECT LOCATION AND STATUS

CROSS-REFERENCE TO RELATED APPLICATIONS

This application claims priority to U.S. Provisional Application Nos. 61/787,780, 61/787,966, and 61/788,104, all filed Mar. 15, 2013, the complete disclosure of which are incorporated herein by reference in their entirety.

BACKGROUND OF THE INVENTION

This application relates generally to dynamic asset tracking and, more particularly, to a data management framework for maintaining location and status information for physical objects, persons, and points in space within a dynamic environment.

Many systems have been developed for tracking and storing information on personnel and physical asset location. Many of these systems involve the use of transponders or tags attached to the persons or objects. These devices may be configured to transmit location information to a central processor either periodically or upon user request. Location information for the tagged personnel or assets may be stored by the central processor in a user-accessible database. Other systems may use Global Positioning System (GPS) technology to determine location along with a communication device for transmitting information to the central processor.

The above-described prior art asset systems require active or passive tags or other devices for every asset to be tracked. This tends to limit the number of assets tracked. Many systems are intended for relatively wide area tracking and are unsuitable for narrow tracking within a particular sub-space (e.g., a room within a building or ship). Those systems that actually are intended for narrow tracking fail to take into account that the surrounding environment may move or change or over time.

A particularly significant example of a dynamic spatial environment is the space on board a large ship. Not only does the ship itself move, its structure is flexible so that the position of a particular compartment or supporting structure in one part of the ship may change relative to other parts of the ship. Similar dynamic behavior can occur in tall buildings, construction sites, outdoor processing plants, roadways, bridges, etc.

Existing systems are also generally limited in the information that is automatically provided to the central processor. Unless the object itself is equipped to provide status information, directly or indirectly, to the central processor, any information on object status must be determined and reported by an observer.

SUMMARY OF THE INVENTION

An illustrative aspect of the invention provides an asset information management system for obtaining and storing information on assets disposed within a structural environment. The system comprises at least one mobile interface device configured for variable disposition within the structural environment and for capturing information about a target object disposed within the structural environment and for transmitting the target object information over a network. The system further comprises a local positioning system in communication with the at least one mobile interface device via the network. The local positioning system is configured to provide information usable to determine a mobile device pose comprising a position and orientation of the mobile interface device relative to the structural environment. The system also comprises a central processor, a domain coordinate management system, an asset log and a spatial indexing engine. The central processor is in communication with the at least one mobile interface device and the local positioning system via the network. An information management operating system operates on the central processor. This information management operating system is configured for receiving and processing the target object information. The domain coordinate management system comprises one or more computers configured for establishing and maintaining spatial addresses for spaces and points within the structural environment. The asset log comprises one or more data storage modules configured for storing information associated with objects disposed within the structural environment. The spatial indexing engine is in communication with the domain coordinate management system, the asset log and the central processor. The spatial indexing engine is configured for assigning a spatial address to the target object and for storing information associated with the target object in the asset log.

Another illustrative aspect of the invention provides a method of storing object information associated with a target object disposed within a structural environment. The method comprises positioning a mobile interface device within a portion of the structural environment where the target object is located. The mobile interface device has a mobile device position and orientation relative to the structural environment. A mobile device pose comprising the mobile device position and orientation relative to the structural environment is determined and object information is captured with the mobile interface device. The method further comprises receiving at a central data processor the mobile device pose and the object information from the mobile interface device. The object information is compared to information stored in an asset log database and a determination is made as to whether the object is recognized based on results of the comparing action. Responsive to determining that the object is recognized, information on the object in the asset log database is updated. Responsive to determining the object is not recognized, a spatial address is assigned to the object, and the object information is stored as a new entry in the asset log database.

BRIEF DESCRIPTION OF THE DRAWINGS

The invention can be more fully understood by reading the following detailed description together with the accompanying drawings, in which like reference indicators are used to designate like elements, and in which:

FIG. 2 is a flow diagram of a method of assigning information addresses to and storing information on assets disposed in a structural environment according to an embodiment of the invention.

DETAILED DESCRIPTION OF THE INVENTION

Figure 1:
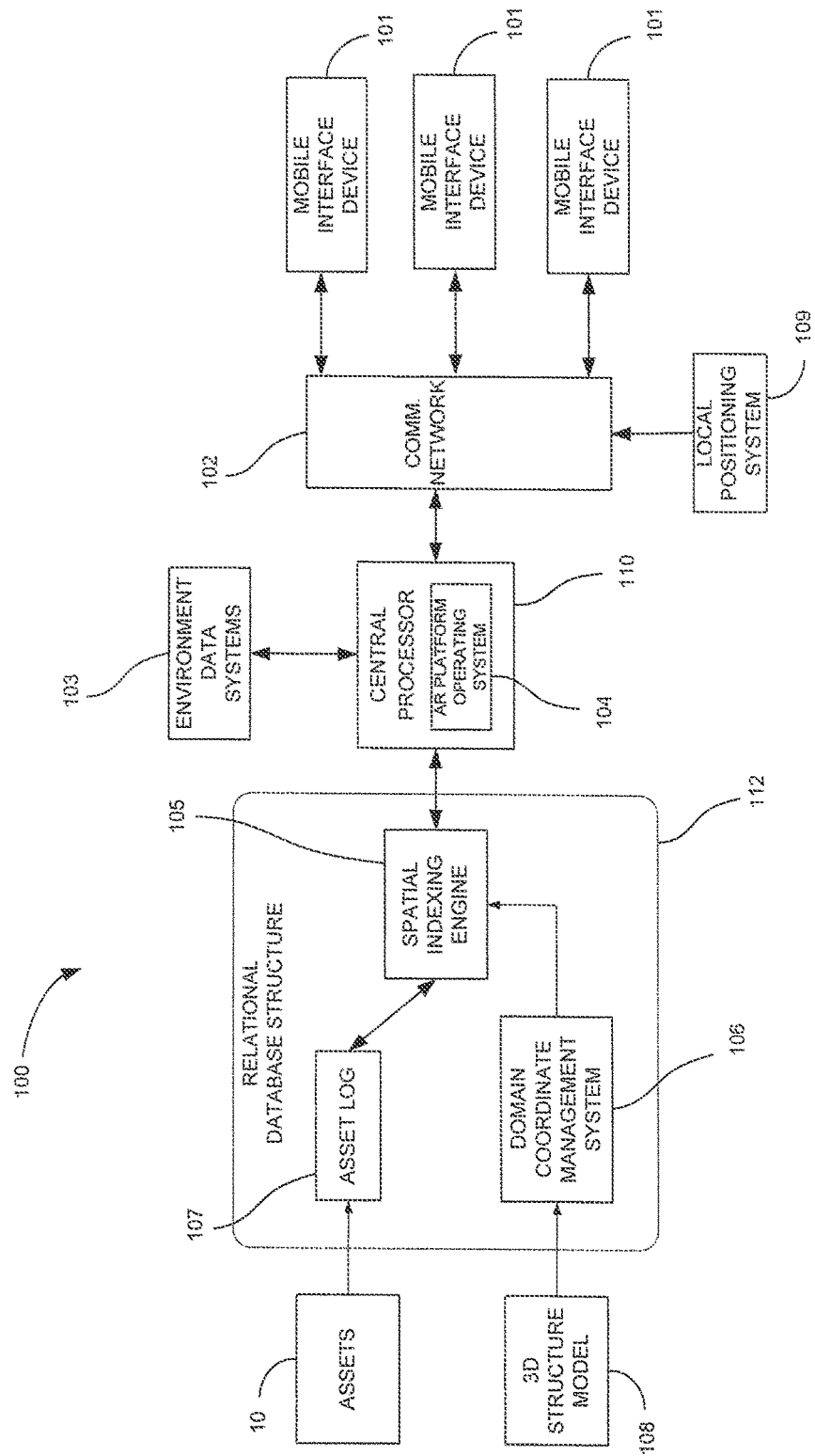
FIG. 1 is a schematic representation of an asset information management system according to an embodiment of the invention.

While the invention will be described in connection with particular embodiments, it will be understood that the invention is not limited to these embodiments. On the contrary, it is contemplated that various alternatives, modifications and equivalents are included within the spirit and scope of the invention as described.

The present invention provides methods and systems for obtaining and maintaining location and status information for physical objects, persons, and points in space (collectively referred to herein as "assets") within a dynamic environment. Currently, no system or method exists to establish an input/output and data management framework for the dynamic and sustained assignment of information addresses to such assets in space in relation to a dynamic environment. While the primary examples and illustrative embodiments used herein to describe the invention relate to ships and other vessels, it will be understood that the invention is not limited to such environments. The invention can be used in, without limitation, land vehicles, buildings and any other dynamically variable structure.

The systems of the invention generally include a relational database structure that allows for storage of and access to information on the assets associated with a particular environment such as a vessel or building. A central processor or operating system is used to receive and process information received from the assets and/or from system users via mobile interface devices, update and store asset information in the database, withdraw information related to identified assets from the database, and send asset-related information to mobile device users, system managers or other requesters.

In particular embodiments, information processed by the central processor may include asset location information from a global or local positioning system, visual or graphical information received from the mobile interface devices, observational information from users, and operational or other data from instrumentation systems associated with the environment or particular assets. Any or all of such information can be used by the central processor to update asset-related information in the database.

In some embodiments of the invention, asset information may be provided to users by the central processor in the form of computer-generated images that can be superimposed on the user's view of an asset and its surroundings. Such images and the information they convey are often referred to as augmented reality (AR). The mobile interface devices used in the systems of the invention can make use of AR in a variety of ways that allow the user to conduct inspection, maintenance, repair, and replacement tasks in relation to particular assets. AR can also be used to assist a user in locating assets or simply navigating within the dynamic environment.

An exemplary system according to the invention that makes use of AR has been referred to as the Shipboard Augmented Reality Platform (ShARP). ShARP is a shipboard operations and maintenance platform designed for commercial and military vessels to:

1) Establish a framework for the dynamic and sustained assignment of information addresses to objects, persons, and points in space in relation to the vessel and,
2) Leverage this framework and its required infrastructure to deliver contextually-relevant information to individual users through visual and other electronic media.

The ShARP system can improve the consolidation, security, management, and presentation of information about the ship's systems and activities to increase crew collaboration and coordination, facilitate rapid execution of tasks, and record human activities. The system uses AR as the primary medium for presenting asset-related information to a user. Such information can include object data and characteristics, previous status information, instructions for use, disassembly and reassembly, or maintenance, hazards, and installation and maintenance history. AR allows presentation of such information on the mobile interface device in graphical or textual form overlaid or adjacent the object as it appears in the camera-generated view on the device screen.

A key to successful implementation of systems like ShARP is the ability to capture, store and update information on all pertinent objects, people and other assets. FIG. 1 depicts an asset information management system 100 according to an exemplary embodiment of the invention. The system 100 is configured for obtaining and storing information on assets disposed throughout a structural environment such as a ship or building. The system 100 comprises a central processor 110 in communication with a relational database structure 112 and in communication with one or more mobile interface devices 101 via a communication network 102. In general, the central processor 110 is configured to receive captured object information from the mobile interface devices 101 and pass it to the components of the database structure 112 and to extract information relating to an object and transmit it to a requesting mobile interface device 101.

The mobile interface device 101 may be any mobile computing solution that is used by a user to facilitate interoperability with the relational database via the central processor 110. The mobile interface device 101 may be, for example, a tablet computer, a smartphone, or a wearable heads-up display. The mobile interface device 101 may include features including, but not limited to a processor, a display (such as a screen), a vision sensor (such as a camera), a microphone, one or more speakers, and wireless communications capabilities. The mobile interface device 101 may include one or more accelerometers. Each mobile interface device 101 may include one or more unique identifiers. In some embodiments, some or all of the mobile interface devices 101 may include one or more local positioning receivers, image and object recognition, audio queues, or electromagnetic field (EMF) receivers or detectors (for GPS, WiFi, or RFID reception or light detection).

In a preferred embodiment, the mobile interface device 101 may be equipped or configured to display AR images/information to a user. The mobile interface device 101 may, in a particular embodiment, be a wearable head-mounted device (HMD) such as that described in U.S. application Ser. No. 14/210,730 entitled "System and Method for Providing Secure Data Display Using Augmented Reality", filed Mar. 14, 2014, which is incorporated herein by reference in its entirety.

The communication network 102 may be a wireless network, a wired network or any combination of wireless network and wired network. In a preferred embodiment, the communications network 102 is a wireless communications network, allowing the mobile interface devices 101 to communicate wirelessly with the central processor 110 and, if so equipped, the AR operating system 104. The communication network 102 may, in particular, be or include a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal.

The central processor 110 may be or comprise on one or more servers or network-enabled computers and may host an AR operating system 104. The mobile interface devices 101 are configured to communicate with the operating system 104. The operating system 104 may be configured to control the interaction of the hardware and software components of the relational database structure 112. In the illustrative embodiment of FIG. 1, the relational database structure 112 comprises a spatial indexing engine 105, a domain coordinate and management system 106, and an asset log 107. The relational database structure is configured to provide a logical framework that allows digital information to be associated with physical objects. This framework includes addresses for both tangible objects as well as individual point addresses within a coordinate system for the structural environment. In an exemplary embodiment, this coordinate system is based on a three dimensional structural model 108 of the environment (e.g., the ship or building). Preferably, the 3D model 108 provides a complete detail of the environment including every space, room or compartment where assets may be disposed.

The domain coordinate management system 106 may be or comprise one or more network enabled computers that maintains spatial addresses for all spaces within the domain of the structural environment. In particular embodiments, the structure is divided into a number of coordinate addresses formatted as volumetric pixels in three dimensions (x, y, z) (sometimes referred to as "voxels" or Volumetric Picture Elements). A voxel is a volume element, representing a value on a regular grid in three dimensional space. These addresses may be recursively subdivided using a voxel octree.

The domain coordinate management system 106 is configured to receive spatial address information from both a local positioning system 109 and from the three dimensional structural model 108. The domain coordinate management system 106 is configured to resolve spatial differences between the coordinate system established by the 3D model of the structure 108 and any available telemetry data received from the local positioning system 109 as a result of changes in the dynamic structure. Such differences may be particularly significant in a large vessel underway at sea. Ships (particularly large ships) are not rigid bodies. Dynamic changes in structure and relative positioning of shipboard systems may occur due to "Sagging" (center of the keel is lower than the static design)

"Hogging" (center of the keel is higher than the static design)

"Twisting" (the keel twists while underway and almost never uniformly)

The use of data from the local positioning system assures that discrepancies relative to the base 3D model are accounted for.

The asset log 107 may be or comprise data storage modules having stored therein one or more tables of all known objects (and associated metadata) within the structure. Objects may include any physical object, including loose items and fixed structural components. The data associated with each object may be stored as a unique asset in the asset log. The system 100 may create and maintain a key attribute 'A' as a unique key identifier for each asset with in the asset log 107.

The three dimensional model 108 may be a computer generated geometric model of the structure. In some embodiments, this may be a model generated for use in the engineering, design, and construction of a building or vessel. The 3D model 108 may include any digital geometric approximation of the structure made subsequent to construction (including but not limited to metadata such as weight, cost, part no., material type, etc.). In preferred embodiments, the model 108 provides a complete inventory of structure spaces and components. Any model of the structure that can be used to establish this inventory (complete or incomplete) and an associated coordinate system may be used by the system 100 to assign digital information to tangible physical objects.

The spatial indexing engine 105 is configured to assign a spatial address to an asset from asset log 107. The spatial indexing engine 105 may connect the mobile interface devices 101 to the asset log 107 and the domain coordinate management system 106 through the operating system 104.

The local positioning system 109 is a system (complete or composite) that facilitates the establishment or estimation of the position and orientation (hereinafter, "pose"), of a mobile interface device 101 within the coordinate system described or approximated by the structure's three dimensional product model 108. As is discussed in more detail in U.S. application Ser. No. 14/210,601 entitled "Method and System for Disambiguation of Augmented Reality Tracking Databases", filed on Mar. 14, 2014 (the "Disambiguation Application"), which is incorporated herein by reference in its entirety, the pose of any object combines its spatial position (x, y, z) and its angular orientation ($\theta$, $\varphi$, $\zeta$). Pose may be accurately established using vision science based algorithms. Vision science based algorithms may recognize on or more unique pre-identified visual tracking cues within a physical space. Other terms such as exterior orientation and translation are synonyms of pose.

The system 100 may use information from more than one local positioning system. Alternatively or in addition, the system 100 may receive and use information from a global positioning system (GPS) (not shown).

Once determined, the pose of the mobile interface device 101 can be associated with an image or other object information captured by the interface device 101. It can also be used in conjunction with such captured information for object identification and to determine changes in object location or orientation.

The local positioning system 109 may be or include any system capable of establishing the position and/or orientation of a mobile interface device. In some embodiments. the local positioning system 109 may comprise a light positioning system that operates by using light points positioned throughout the physical spaces of the vessel. An example of a light positioning system is described in U.S. Pat. No. 8,248,467, which is incorporated herein by reference. In some embodiments, the local positioning system 109 may use electromagnetic or sound waves emanating from various points within the physical spaces of the vessel. Examples of electromagnetic or sound waves include radio frequency identification (RFID) signals, radio signals, WiFi signals, audio tones, and/or sound waves. The local positioning system 109 may use unique images or recognizable visual features, quick response (QR) codes, bar codes, or point-clouds placed throughout the physical space of the structure.

It will be understood that various processing components of the system 100 may be combined into a single processor or further subdivided into multiple processors or servers. It will be appreciated that in some cases, multiple instances of a particular component of the system 100 may be used. Moreover, the system 100 may include other devices not depicted in FIG. 1.

It will also be understood that the operating system and multi-dimensional database provide front-end input/output service for multiple back-end data streams and are designed to interface with existing information architectures through application program interfaces (APIs).

The system 100 and other system embodiments of the invention may be used to capture and store asset information for later comparison and use with subsequently captured information for the same asset. The system 100 can also be used to provide information to a user on request or automatically upon receiving updated information for an asset from a mobile interface device 101.

FIG. 2 shows an exemplary method M100 for assigning information addresses to and storing information on objects, persons, and points in three-dimensional space in relation to a structure such as a building or a vessel using the system 100. The method M100 begins at step S10. At step S10, the mobile device user enters the space or introduces the mobile device into the space. The space may be a room inside a vessel or other structure. In step S20, the user aims the mobile interface device camera at an object or area of interest (referred to herein as the "target object") within the space. The target object may, for example, be a pump located in a room in a ship or an area in which the pump is expected to be found. As previously discussed, the mobile interface device (client) may be any mobile computing solution that can be used to capture object information and communicate that information to the operating system and relational database. The mobile interface device may be, for example, a tablet computer, a smartphone, or a wearable heads-up display.

At step S30, the mobile interface device's pose (preferably, its "narrow pose") is established. The process of determining the device's narrow pose is described in the Disambiguation Application. Determination of the device's narrow pose allows the system to, inter alia, completely specify the spatial relationships of objects in images captured by the mobile interface device. At step S40, the mobile interface device captures information on the features of the target object. Such information may be obtained by capturing images using the device camera, from user entry, or from sensor data. Object information may include one or more object images, object geometry, and object location/orientation relative to the mobile device. The mobile device may use one or more pattern and object recognition algorithms to process the captured information.

At step S50, the user may use the mobile device to "trim" the captured object information so that only the object's data is packaged for transmission to the spatial indexing engine 105. This process may include common data validation and compression techniques.

At step S60, the object information may be transmitted to the operating system 104, via the communications network 102. The object information may be transmitted immediately or stored on the mobile device and later synced with the operating system 104 via the communications network 102.

At step S70, the spatial indexing engine 105 receives the object data and compares the object data (including the images, geometry, tags, etc.) and location information with comparable information of known objects and their assigned locations. The known object information is preferably stored in the asset log 107. At S80, the spatial indexing engine 105 makes a determination as to whether captured object information matches the information associated with an existing asset in the asset log 107. In other words, the spatial indexing engine determines if the object's data is recognized. If the object is recognized as a known object, the method proceeds to step S90A. If the object is not recognized as a known object, the method proceeds to step S90B.

At step S90A, the operating system 104 or the spatial indexing engine 105 may update the data associated with the recognized object based on the new information received from the mobile device. This action may optionally be conditioned on a determination that a particular aspect (e.g., location, orientation, status, etc.) of the object has changed.

In response to a determination that no object information in the asset log 107 matches that of the target object, the operating system 104 and/or the spatial indexing engine 105 creates a new asset in the asset log 107 at S90B. The information associated with the new object is based on the captured object information. A geometric reservation with an indexed address may optionally be inserted into the domain coordinate management system 106 as well.

The method M100 ends at S95.

As has been discussed, while the systems and methods of the present invention have a particular value when applied to vessels and other mobile structures, they may also be applied to stationary buildings and other structures as well. In stationary environments, GPS and GIS information are typically available and may be used by the operating system. The invention is, however, of particular utility in shipboard or other mobile/dynamic environments in which GPS information may be unreliable or unavailable. As has also been discussed, the present invention also addresses the problem of dynamic changes in structure and relative positioning such as are often encountered in large vessels.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. An asset information management system for obtaining and storing information on assets disposed within a physical structural environment, the system comprising:

at least one mobile interface device configured for variable disposition within a physical dynamic structure in the physical structural environment, for capturing information about a target object disposed within the physical dynamic structure, and for transmitting the target object information over a network;

a local positioning system in communication with the at least one mobile interface device via the network and configured to provide information usable to determine a mobile device pose, said mobile device pose comprising a position and orientation of the mobile interface device relative to the physical structural environment;

a central processor in communication with the at least one mobile interface device and the local positioning system via the network and having an information management operating system operating thereon, the information management operating system being configured for receiving and processing the target object information;

a domain coordinate management system comprising one or more computers configured for establishing and maintaining spatial addresses for spaces and points within the physical structural environment, for receiving first spatial address information from the local positioning system and second spatial address information from a three-dimensional model of the physical dynamic structure, and for determining differences between the first and second spatial address information resulting from spatial changes in the physical dynamic structure;

an asset log comprising one or more data storage modules configured for storing information associated with objects disposed within the physical structural environment; and a spatial indexing engine in communication with the domain coordinate management system, the asset log and the central processor, the spatial indexing engine being configured for assigning a spatial address to the target object and for storing information associated with the target object in the asset log.

2. An asset information management system according to claim 1, wherein the target object information captured by the mobile interface device includes information usable with the mobile device pose to determine the target object's position and orientation relative to the physical structural environment.

3. An asset information management system according to claim 1, wherein the mobile interface device is configured for capturing an image of the target object, the image being included in the target object information.

4. An asset information management system according to claim 1, wherein the mobile interface device is one of the set consisting of a tablet computer, a smartphone, and a wearable heads-up display.

5. An asset information management system according to claim 1, wherein the mobile interface device is configured for capturing an image of the target object and for displaying the captured image with a superimposed computer-generated image associated with at least one of the set consisting of the target object and a portion of the physical structural environment in which the target object is disposed.

6. An asset information management system according to claim 1, wherein the target object information includes at least one of the set consisting of an image of the target object, information on target object geometry, information on target object location, and information on target object orientation.

7. An asset information management system according to claim 1, wherein the information associated with the target object stored in the asset log by the spatial indexing engine includes a position and an orientation of the target object relative to the physical dynamic structure.

8. An asset information management system according to claim 1, wherein the position and orientation of the target object relative to the physical dynamic structure are determined from the mobile device pose, an image captured by the mobile device, and spatial differences resulting from changes in the physical dynamic structure.

9. An asset information management system according to claim 1, wherein the spatial indexing engine is further configured for
receiving target object information from the central processor,
comparing the target object information to known object information stored in the asset log,
and assigning a spatial address to the target object only if the object information does not match any known object information in the asset log.

10. An asset information management system according to claim 1, wherein the local positioning system is configured to determine the mobile device pose using pre-identified visual tracking cues within the physical structural environment.

11. A method of storing object information associated with a target object disposed within a physical structural environment, the method comprising:
positioning a mobile interface device within a portion of the physical structural environment where the target object is located, the mobile interface device having a mobile device position and orientation relative to the physical structural environment;
determining a mobile device pose comprising the mobile device position and orientation relative to the physical structural environment;
capturing object information with the mobile interface device;
receiving at a central data processor the mobile device pose and the object information from the mobile interface device;
determining a location and orientation of the object relative to the physical structural environment, accounting for spatial changes in the physical structural environment;
adding the location and orientation of the object to the object information;
comparing the object information to information stored in an asset log database;
determining whether the object is recognized based on results of the comparing action;
responsive to determining that the object is recognized, updating information on the object in the asset log database; and
responsive to determining the object is not recognized, assigning a spatial address to the object, and
storing the object information as a new entry in the asset log database.

12. A method according to claim 11 wherein the action of capturing object information includes:
capturing an image of the object.

13. A method according to claim 12 wherein the action of capturing object information further includes:
applying object recognition techniques to the object image to provide an object recognition result; and
adding the object recognition result to the object information.

14. A method according to claim 11 wherein the action of determining a location and orientation of the object relative to the physical structural environment-includes:
determining first spatial address information for the object using the object information and information from a local positioning system;
determining second spatial address information for the object using a three-dimensional model of the physical dynamic structure; and
determining differences between the first and second spatial address information resulting from changes in the physical structural environment.

15. A method according to claim 11 wherein the location and orientation of the object are determined at least in part from the mobile device pose and an image captured by the mobile interface device.

16. A method according to claim 11 wherein the object information includes at least one of the set consisting of an image of the object, a geometry of the object, and information from a tag attached to the object.

17. A method according to claim 11 further comprising:
transmitting the object information by the mobile interface device over a wireless communication network.

18. A method according to claim 11 wherein the action of updating information on the object in the asset log database includes noting changes in at least one of the set consisting of object location, object orientation, and object status.

* * * * *